Sept. 26, 1967   R. J. DERLETH ET AL   3,343,927

SINTERED METAL BRAKE DRUM

Filed Dec. 18, 1963

INVENTORS
ROBERT J. DERLETH & ALEXANDER BREDE III

BY

Barnes, Kisselle, Raisch & Choate

ATTORNEYS

United States Patent Office 3,343,927
Patented Sept. 26, 1967

3,343,927
SINTERED METAL BRAKE DRUM
Robert J. Derleth and Alexander Brede III, Lansing, Mich., assignors, by mesne assignments, to Motor Wheel Corporation, Akron, Ohio, a corporation of Ohio
Filed Dec. 18, 1963, Ser. No. 331,533
10 Claims. (Cl. 29—182.1)

This invention relates to brake drums and in particular to a brake drum having sintered brake track material which possesses high thermal conductivity.

Overheated brake drums produce numerous problems including brake fading, brake drum distortion, reduced brake shoe lining life, and reduced brake track life.

The objects of this invention are to provide a sintered brake track material which has improved physical properties including better friction characteristics, better wear characteristics, and increased thermal conductivity; which decreases thermal expansion, thermal fatigue, and distortion of the drum; which increases the life of brake shoe linings and brake tracks; and which may be attached to a brake drum shell without a separate attaching operation.

Further objects of this invention are to provide a method for making brake track material and a method for lining a brake drum effectively and economically with little or no machining of the finished article.

Figure 1:
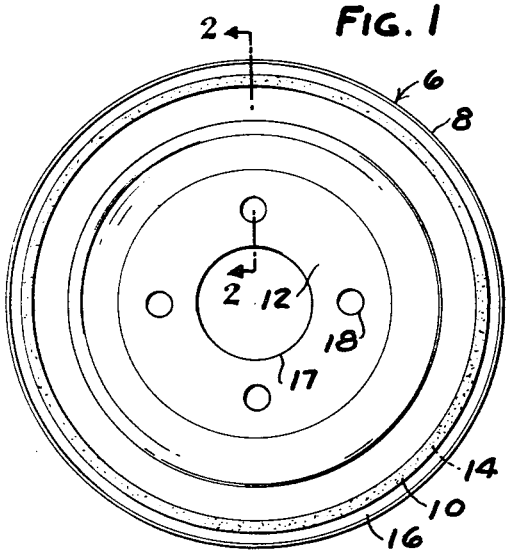
FIG. 1 shows a brake drum, looking into the cavity thereof, the brake drum having a sintered metal powder brake track.
Figure 2:
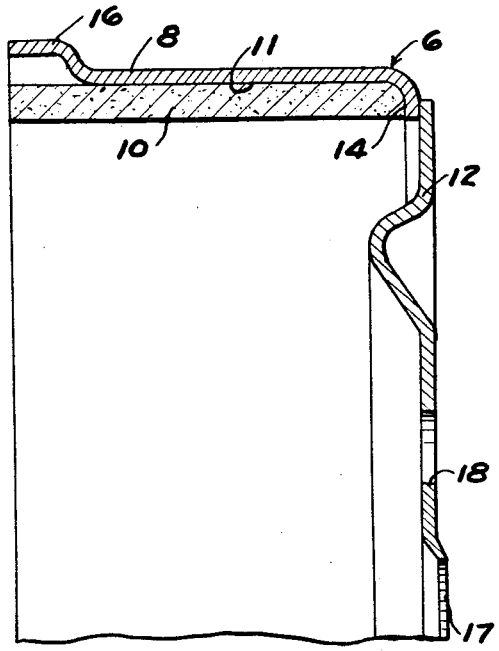
FIG. 2 is an enlarged fragmentary section taken through line 2—2 of FIG. 1.

FIGS. 1 and 2 show a finished brake drum 6 comprising a generally cylindrical steel shell 8, a brake track 10 that lines the inner cylindrical surface 11 of shell 8, and a drum back 12 which is brazed to a radially inward extending flange 14 on shell 8. Shell 8 also has an outwardly flared portion 16 that forms a dust seal when drum 6 is assembled with other brake parts. Back 12 is provided with a central aperture 17 and bolt holes 18 for assembling drum 6 on other wheel parts. Brake track 10 is sintered metal powder, primarily finely divided iron particles with carbon and possibly other alloying elements. A substantial quantity of high thermal conductivity material fills the voids or interstices between the finely divided iron particles. This high thermal conductivity material extends throughout the iron particles, from the inner peripheral surface to the outer peripheral surface of brake track 10 and brazes track 10 to shell 8.

Figure 3:
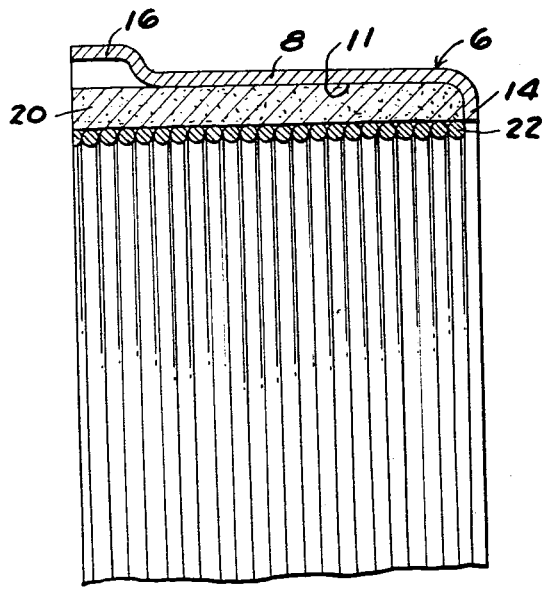
FIG. 3 illustrates an exemplary manner by which copper may be positioned adjacent a green compact prior to a sintering operation to infiltrate the brake track material.

In fabricating brake drum 6, iron powder along with graphite and a suitable lubricant is compacted into a green compact sleeve 20 (FIG. 3) by conventional techniques. As shown in FIG. 3, sleeve 20 is assembled within shell 8 and a coil of copper wire 22 is placed in contact with the inner surface of sleeve 20. Shell 8, sleeve 20, and coil 22 are heated to a temperature of approximately 2000° F. to sinter the iron powder in sleeve 20 and melt the copper in coil 22. The copper from coil 22 infiltrates radially outward through sleeve 20, filling the voids between the iron particles in sleeve 20, and contacts shell 8 to braze the sleeve 20 to the shell.

Copper may also be infiltrated throughout finished brake track 10 by compacting sleeve 20 from a mixture of iron powder and copper powder. However, infiltration from a source of copper external to sleeve 20 produces a brake track superior to one produced by using a mixture of iron powder and copper powder. In the infiltrating process the voids or interstices between the finely divided iron are filled by molten copper from a source external of sleeve 20 while, if the copper must come from copper powder mixed with the iron powder, additional voids are created when the copper melts.

By way of example, sleeve 20 may be made from a mixture of pure iron powder with about one percent graphite by weight and one and one-fourth percent lithium stearate (lubricant) by weight. One useful iron powder has a Tyler Mesh analysis as follows:

|  | Percent |
|---|---|
| +100 | 0.1 |
| +150 | 7.0 |
| +200 | 22.0 |
| +250 | 17.0 |
| +325 | 27.0 |
| −325 | 27.0 |

When this mixture is compacted under pressures in the order of 30 (thirty) tons per square inch, about 20 percent copper by weight of the iron powder is used to substantially fill the voids.

Since copper has a melting temperature of about 1981° F. and the sintering temperature range for iron powder compacts generally is about 1500° F. to 2200° F., the particular sintering temperature used must exceed 1981° F. during the process. The preferred temperature is 2000° F. Although the combined sintering sintering and infiltrating method has been disclosed in conjunction with the assembly shown in FIG. 4, it is to be understood that the brake track material can be sintered and infiltrated simultaneously, prior to being assembled within shell 8.

We claim:

1. A brake drum comprising support means constructed and adapted to assemble said drum on other wheel parts for rotation therewith and brake track material secured to said support means and comprising sintered ferrous metal infiltrated with an infiltrant material having a thermal conductivity substantially higher than that of said ferrous metal and a melting temperature in the sintering temperature range of said ferrous metal.

2. The brake drum set forth in claim 1 wherein said infiltrant material is substantially free of metal phosphides.

3. The brake drum set forth in claim 1 wherein the amount of infiltrant material is on the order of twenty percent by weight of the sintered metal.

4. A brake drum comprising support means constructed and adapted to assemble said drum on other wheel parts for rotation therewith and brake track material secured to said support means and comprising sintered ferrous metal particles having interstices between said particles filled with an infiltrant material having a thermal conductivity substantially higher than that of said metal and a melting temperature in the sintering temperature range of said metal.

5. A brake drum comprising support means constructed and adapted to assemble said drum on other wheel parts for rotation therewith and brake track material comprising copper infiltrated sintered iron.

6. A brake drum comprising a hollow cylindrical shell having an annular brake track disposed within said shell and attached thereto, said brake track having a generally smooth inner cylindrical surface dimensioned and constructed to cooperate with a brake shoe lining of friction material and said brake track comprising sintered ferrous metal infiltrated with a material having a thermal conductivity substantially higher than that of said sintered ferrous metal and a melting temperature in the sintering temperature range of said ferrous metal.

7. The brake drum as set forth in claim 6 wherein said shell and said brake track are brazed together by said material to secure said brake track to said shell.

8. A brake drum comprising a hollow cylindrical shell having an annular brake track disposed within said shell and attached thereto, said brake track having a generally smooth inner cylindrical surface dimensioned and constructed to cooperate with a brake shoe lining of friction material and said brake track comprising copper infiltrated sintered iron.

9. A brake for an automotive vehicle and the like comprising a brake lining formed of friction material and a brake drum including a brake track for frictionally engaging against said lining, said brake track comprising sintered ferrous metal infiltrated with a material having a thermal conductivity substantially higher than that of said ferrous metal and a melting temperature in the sintering temperature range of said ferrous metal.

10. In a brake for a vehicle wheel and the like a brake rotor comprising support means constructed and adapted to assemble said rotor on other wheel parts and the like for rotation therewith and brake track material arranged on said rotor for braking engagement with a brake lining of friction material, said brake track material comprising sintered ferrous metal infiltrated with an infiltrant material having a thermal conductivity substantially higher than that of said ferrous metal and a melting temperature in the sintering temperature range of said ferrous metal.

References Cited

UNITED STATES PATENTS

| | | | |
|---|---|---|---|
| 1,927,626 | 9/1933 | Calkins | 75—223 |
| 2,287,952 | 6/1942 | Toruyn | 75—208 X |
| 2,396,101 | 3/1946 | Hensel et al. | 29—182.1 |
| 2,462,821 | 2/1949 | Wellman | 29—149.5 X |
| 2,577,187 | 12/1951 | Fox | 29—149.5 |
| 2,648,747 | 8/1953 | Herbert | 29—182.1 |
| 2,706,693 | 4/1955 | Haller | 29—182.1 X |
| 2,706,694 | 4/1955 | Haller | 29—182.1 X |
| 2,778,742 | 1/1957 | Shipe | 29—182.1 X |
| 2,973,842 | 3/1961 | Smiley | 188—251 |
| 2,977,673 | 4/1961 | Weinman | 29—191.2 X |
| 2,979,401 | 4/1961 | Szymaszek | 75—223 |
| 3,014,884 | 12/1961 | Bray | 188—251 X |
| 3,105,292 | 10/1963 | Jeune | 29—424.4 X |
| 3,120,436 | 2/1964 | Harrison | 29—182.1 X |
| 3,184,001 | 5/1965 | Reinsch et al. | 188—218 X |
| 3,210,303 | 10/1965 | Biggs | 188—251 X |

BENJAMIN R. PADGETT, *Primary Examiner.*

EUGENE G. BOTZ, CARL D. QUARFORTH, L. DEWAYNE RUTLEDGE, *Examiners.*

GEA HALVOSA, M. J. SCOLNICK,
*Assistant Examiners.*